United States Patent
Iwasaki et al.

(10) Patent No.: US 6,198,876 B1
(45) Date of Patent: Mar. 6, 2001

(54) METHOD AND APPARATUS FOR RECORDING AND/OR REPRODUCING DATA WHEREIN PADDING DATA MAY BE ADDED DURING RECORDING AND REMOVED DURING REPRODUCTION

(75) Inventors: Yasuo Iwasaki; Shogo Suzuki; Makoto Ogura, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/865,942

(22) Filed: May 30, 1997

(30) Foreign Application Priority Data

Jun. 12, 1996 (JP) ............................................. P08-151161

(51) Int. Cl.[7] .............................. H04N 5/76; H04N 5/781
(52) U.S. Cl. .............................. 386/95; 386/125; 386/126
(58) Field of Search .................................. 386/15, 36, 95, 386/45, 122, 125–126; 360/22–23; 348/13, 7, 12; H04N 5/76, 5/92, 9/79

(56) References Cited

U.S. PATENT DOCUMENTS

| | | | |
|---|---|---|---|
| 5,218,672 | * | 6/1993 | Morgan et al. ........................ 386/126 |
| 5,497,244 | * | 3/1996 | Chargin, Jr. et al. ................. 386/125 |
| 5,510,905 | * | 4/1996 | Birk ....................................... 386/125 |
| 5,530,557 | * | 6/1996 | Asit et al. ............................. 386/125 |
| 5,532,830 | * | 7/1996 | Schuler ................................. 386/125 |
| 5,553,005 | * | 9/1996 | Voeten et al. ......................... 386/125 |
| 5,630,007 | * | 5/1997 | Kobayashi et al. ................... 386/125 |
| 5,719,983 | * | 2/1998 | Henderson et al. .................. 386/125 |
| 5,754,730 | * | 5/1998 | Windren et al. ...................... 386/125 |

* cited by examiner

*Primary Examiner*—Thai Tran
(74) *Attorney, Agent, or Firm*—Frommer Lawrence & Haug, LLP.; William S. Frommer; Dennis M. Smid

(57) ABSTRACT

A data recording/reproducing apparatus in which plural disc-shaped recording/reproducing means are run in parallel. The apparatus is designed for avoiding the risk of the write/readout unit being changed in size to lower the transfer rate to raise the cost brought about by changing the number of the disc-shaped recording/reproducing means. A disc array unit 11 accesses video data of 163840 bytes equal to 40 times as many as 4096 bytes and audio data of 8192 bytes equal to twice as many as 4096 bytes to a data driving unit 11D made up of seven HDDs with a size of, for example, 3584 bytes. An accessing control unit 12 controls data accessing to the disc array unit 11. A data adjustment unit 25 appends a volume of nonsensical data (padding data) equal to a multiple of 3584 bytes at the time of recording, while taking out data excluding the padding data during reproduction in terms of 4096 bytes as a unit.

13 Claims, 11 Drawing Sheets

METHOD AND APPARATUS FOR RECORDING AND/OR REPRODUCING DATA WHEREIN PADDING DATA MAY BE ADDED DURING RECORDING AND REMOVED DURING REPRODUCTION

BACKGROUND OF THE INVENTION

1. Field of the Invention

This invention relates to a data recording/reproducing apparatus in which plural disc-shaped recording/reproducing means are run in parallel for increasing redundancy and reliability for assuring high processing speed and a large storage capacity.

2. Description of the Related Art

Recently, in an AV editing system configured for editing audio and video (AV) data and sending out the edited AV data, a disc array device, comprised of parallel connection of plural disc-shaped recording/reproducing means, such as magneto-optical disc drive or hard disc drive, has come into use for improving the recording capacity for recording the AV data and for improving the data transfer rate.

The disc array device uses plural disc-shaped recording/reproducing means, such as magneto-optical disc drive or hard disc drive, for improving the redundancy and reliability. In addition, the data transfer rate is increased for recording/reproducing digital data, such as video or audio data.

The disc array device is classified into five levels of RAID (Redundant Arrays of Inexpensive Discs) 1 to RAID 5, depending on characteristics, such as accommodation to reliability, interleaving, storage of error correction code and management.

In general, the digital data, such as video or audio data, is larger than computer data in size of data accessible at a time. Thus, for the disc array device handling the AV data, the RAID 3 type is used, in which AV data are striped on the bit or byte basis for reading or writing from or to plural hard disc drives in unison and in which a hard disc for reading or writing data is fixed.

FIG. 1 shows the constitution of a disc array device 60 handling such AV data. This disc array device 60 can handle plural disc drives (HDDs) as if these disc drives were a sole recording/reproducing means. For example, the AV data, divided into 16 portions (0, 1, 2, . . . , 15) are assorted and recorded via a disc array controller 62 in HDDs 611, 612, . . ., 618, at the same time as the AV data portions are coupled to a HDD 61P configured for recording only parity P1, P2, . . . calculated from these AV data. This raises the redundancy while assuring the reliability. Since a parity HDD 61P is associated with eight HDDs for data HDD611, HDD 612, . . . , HDD618, the transfer rate is ideally 192 Mbps if the transfer rate per each HDD is 24 Mbps.

It is assumed that an AV editing system as shown in FIG. 2 is constituted using such disc array device 60. If an AV editing controller 65 for editing AV data and the disc array device 60 are connected to each other by small computer system interfaces (SCSIs) 66, 67, which are customary interfaces, for constituting an AV editing system, the minimum unit of data accessible at a time, that is the size of the write/readout unit (sector unit) of the disc array device 60, is as shown in FIG. 3. If the 512×8=4096 bytes. If the write/readout unit (sector unit) per HDD is 512 bytes, as an example, the size of the write/readout unit of the disc array device is 512×8=4096 bytes.

Assuming that data handled is the AV data of the D2 standard, video data is made up of two frames compressed to approximately 1/7, and four channels of audio data are appended. Thus the transfer format is made up of 163840 bytes of video data followed by four channels each comprised of 8192 bytes of audio data, as shown in FIG. 4.

In such transfer format, the size of the video data and that of the audio data are multiples of the size of the write/readout unit of 4096 bytes, indicated as blocks as shown in FIG. 5. Thus the interruptions between the video data and the audio data or the interruptions between the audio data coincide with the interruptions of the write-readout units in the inside of the disc array device 60.

Therefore, even in case of an editing operation of rewriting only image data or individually accessing audio data of each channel for data interchanging, data readout/writing is possible without any inconvenience, so that these functions can be realized without lowering the performance.

Recently, with improved performance of the HDD, it has become possible to maintain or improve the overall transfer rate or capacity even if the number of HDDs used for data in the inside of a sole disc array device is reduced.

On the other hand, if the number of HDDs in the inside of the disc array device is changed, the size of the writing/readout unit in the disc array device of the RAID 3 configuration is changed. If, for example, the number of the HDDs of the disc array device 60 shown in FIG. 1 is reduced by one and a sole HDD for parity is allocated to the seven HDDs, the size of the write/readout unit of the disc array device is 512×7=3584 bytes, as shown in FIG. 6.

Meanwhile, if an AV editing system shown in FIG. 2 is constituted by the disc array device employing seven HDDs for data, the size of the write/readout unit of 3584 bytes of the disc array device is not al aliquot part of the AV data size of the transfer format, as a result of which the interruption of video data or audio data is not coincident with the interruption of the write/readout unit of 3584 bytes of the disc array device (shown as a block), as shown in FIG. 7.

Thus, if video and audio data are contiguously recorded by the data transfer format shown in FIG. 4, but if video and audio data are desired to be reproduced or edited beginning from the interruption point of the video or audio data, it becomes necessary to invoke the entire blocks (write/readout units) containing the data interruption points and to reproduce only required portions or partially interchange recording data before proceeding to calculation of parity data for recording. In FIG. 7, blocks 46, 48, 50, 52 and 54 represent blocks containing data interruption points.

That is, for data reproduction, superfluous data not desired to be reproduced is read out during data reproduction. These superfluous data, thus read out, are not reproduced and hence need to be removed. For data recording, if the interruption point of video or audio data is not coincident with the junction point of the block (write/readout unit) of the disc array device, it becomes necessary to read out data of the entire block also containing unchanged data portions. In addition, although data only of the recording portion has been changed, parity data are updated along with unchanged data portions.

These operations lower the average transfer rate during editing or variable speed reproduction of the disc array device. The result is that an additional circuit is required for assuring data continuity essential for video and audio data or the apparatus is complicated in its entirety thus raising the cost. In addition, the editing system apparatus in its entirety cannot exhibit performance so that it cannot cope with multi-channel processing.

SUMMARY OF THE INVENTION

It is therefore an object of the present invention to provide a data recording/reproducing apparatus whereby the transfer rate is prohibited from being lowered and the size of the input/output data can be matched to the data write/readout size while avoiding increased cost.

In one aspect, the present invention provides a data recording/reproducing apparatus including a plurality of disc-shaped recording/reproducing means in which the data size that can be accessed at a time can be controlled by changing the number of the recording/reproducing means loaded in position during data recording, and data adjustment means for appending padding data so that, if the volume of data for recording is not equal to a multiple of the data size accessed at a time, the volume of data for recording with the padding data appended thereto will equal to the multiple.

When data recorded with the padding data appended thereto are reproduced, the data adjustment means preferably manages control so that the padding data will not be reproduced.

Preferably, the recording data are video and audio data according to a format having a pre-set data size.

Preferably, the data recording/reproducing apparatus further includes an interface for connection to an audio/video editing controller for editing the video and audio data, while t h e interface is an SCSI interface.

Preferably, the data adjustment means appends padding data in the last accessing for recording the data so that, if the volume of data for recording is not equal to a multiple of the data size accessed at a time, the volume of data for recording with the padding data appended thereto will equal to the multiple of the data size accessed at a time.

When reproducing recorded data, the data adjustment means preferably manages control so that, during the last accessing for reproducing the recorded data, the padding data will not be reproduced.

Preferably, the data adjustment means appends padding data in each accessing for recording the data so that, if the volume of data for recording is not equal to a multiple of the data size accessed at a time, the volume of data for recording with the padding data appended thereto will equal to the multiple of the data size accessed at a time.

When reproducing the recorded data, the data adjustment means preferably manages control so that, in each accessing for reproducing the recorded data, the padding data will not be reproduced.

Preferably, the data recording/reproducing apparatus further includes a circuit for calculating the parity for data recorded on a plurality of the disc-shaped recording/reproducing means.

Preferably, parity data outputted by the parity calculating circuit is recorded in a pre-set one of the plural disc driving devices.

In another aspect, the present invention provides a data recording method for recording video and audio data according to a format having a pre-set data size on a plurality of detachably mounted disc-shaped recording/reproducing means. The method includes setting a data size accessed at a time in accordance with the number of the disc-shaped recording/reproducing means loaded in position at the time of data recording, appending padding data in the last accessing for recording the data so that, if the volume of data for recording is not equal to a multiple of the data size accessed at a time, the volume of data for recording with the padding data appended thereto will equal to the multiple, and recording the video and audio data on the disc-shaped recording/reproducing means in terms of a data size accessed at a time as a unit.

In yet another aspect, the present invention provides a method for reproducing data recorded by the above defined data recording method. The reproducing method includes reproducing all read-out data in each accessing for reproducing the recorded data other than the last accessing in which the padding data have been appended and reproducing the recorded data excluding the padding data in the last accessing in which the padding data have been appended.

With the data recording/reproducing apparatus according to the present invention, accessing of data of a pre-set size relative to an optional write/readout size of plural disc-shaped recording/reproducing means is controlled by accessing control means. In addition, data adjustment means appends nonsensical data to a superfluous portion brought about in the minimum data unit of the pre-set size with respect to the optional write/readout size during recording, while outputting the data excluding the nonsensical data with the minimum unit, thus enabling suppression of the transfer rate without raising the cost and also enabling adjustment of the size of the input/output data to the size of the write/readout unit.

DESCRIPTION OF THE PREFERRED EMBODIMENTS

Figure 1:
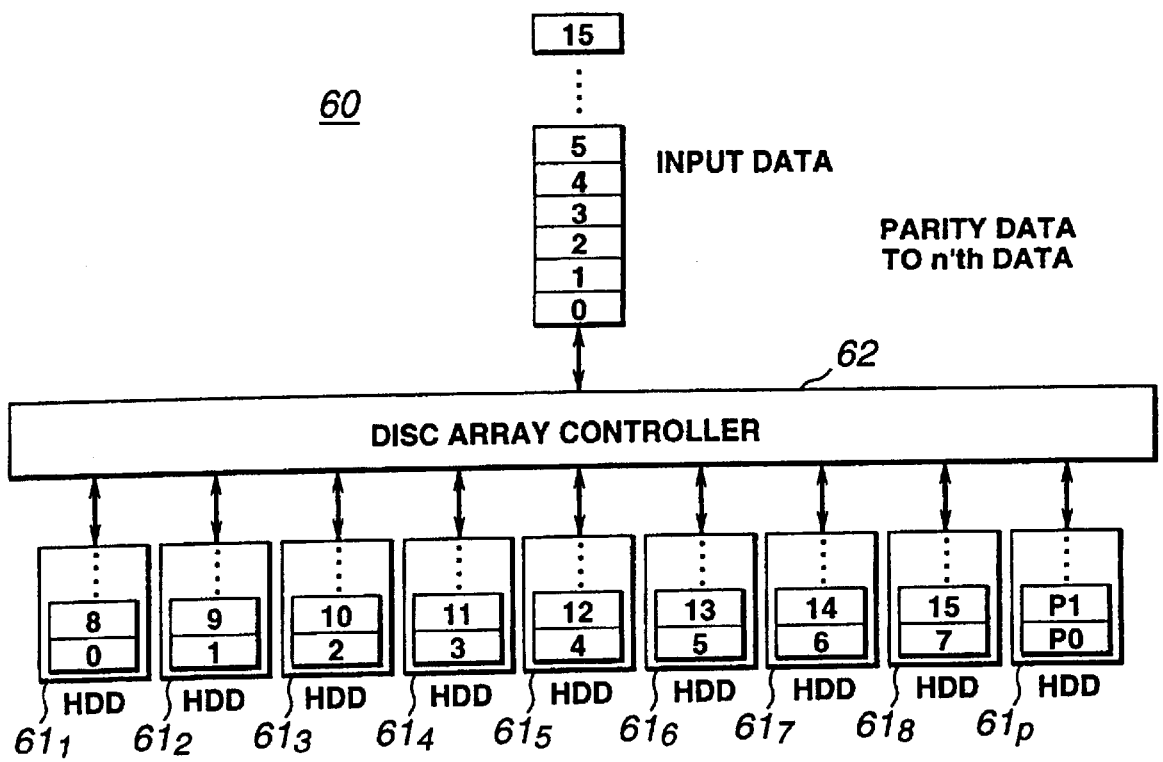
FIG. 1 is a block diagram of a conventional disc array device.
Figure 2:
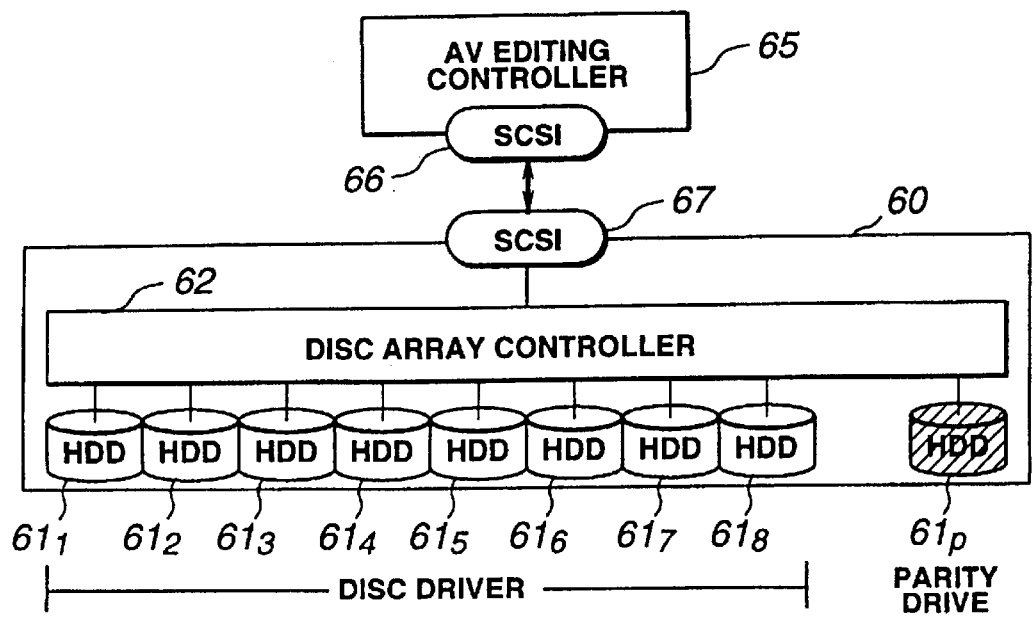
FIG. 2 is a block diagram of an AV editing system employing a disc array device shown in FIG. 5.

Referring to the drawings, preferred embodiments of the present invention will be explained in detail. The present embodiment is directed to a disc array device 10 connected to an audio video (AV) editing controller 50 for constituting an AV editing system 1.

The disc array device 10 includes a disc array unit 11 for accessing video data of 163840 bytes equal to 40 times of 4096 bytes and audio data of 8192 bytes equal to twice the 4096 bytes to a data drive unit 11D made up of seven hard disc drives (HDDs) with a size of, for example, 3584 bytes, at a time, an access control unit 12 for controlling the data accessing to this disc array unit 11 and a data adjustment unit 25 for appending nonsensical data (padding data) to a superfluous portion produced by non-coincidence between the size of 3584 bytes and the data size of 4096 bytes during recording and for removing the padding data during reproduction for taking out the data.

The disc array unit 11 is controlled by the access control unit 12 to record distributed AV data on HDDs 111, 112, 113, 114, 115, 116 and 117 of the data drive unit 11D and to record parity in an HDD lip constituting a parity drive unit. This disc array unit 11 records or reproduces AV data in parallel on the seven HDDs 111, 112, 113, 114, 115, 116 and 117 of the data drive unit 11D for improving the recording capacity and transfer rate thus realizing higher reliability than is possible with the sole disc device.

The access control unit 12 includes SCSI protocol controller (SPC) 131, 132, 133, 134, 135, 136, 137 and 13P, as device controllers connected in association with the HDDs 111, 112, 113, 114, 115, 116 and 117, respectively, collection/distribution circuits 141, 142, 143, 144, 145, 146, 147 and 14P for collecting or distributing AV data and parity to or from the HDDs 111, 112, 113, 114, 115, 116 and 117 and lip via SPCs 131, 132, 133, 134, 135, 136, 137 and 13P, a data multiplexer 15 provided between the collection/distribution circuits 141, 142, 143, 144, 145, 146, 147 and 14P and the data adjustment unit 25 for switching selection of the AV data and a parity calculating circuit 16 for calculating the parity from AV data from the data multiplexer 15. Each of the collection/distribution circuits 141, 142, 143, 144, 145, 146, 147 and 14P includes a memory and a controller.

The SPCs 131, 132, 133, 134, 135, 136, 137 and 13P are controlled by a central processing unit (CPU) 18 for controlling the input/output of the HDDs 111, 112, 113, 114, 115, 116 and 117 and lip. Each of the collection/distribution circuits 141, 142, 143, 144, 145, 146, 147 and 14P is responsive to a data election signal from the CPU 18 to distributer or collect AV data to or from the HDDs 111, 112, 113, 114, 115, 116, 117 and lip.

The data adjustment unit 25 has a padding data processing circuit 26 for controlling a SCSI interfacing circuit 27 and a buffer memory 28 by direct memory accessing (DMA) for appending or removing the padding data to or from the AV data.

Figure 9:
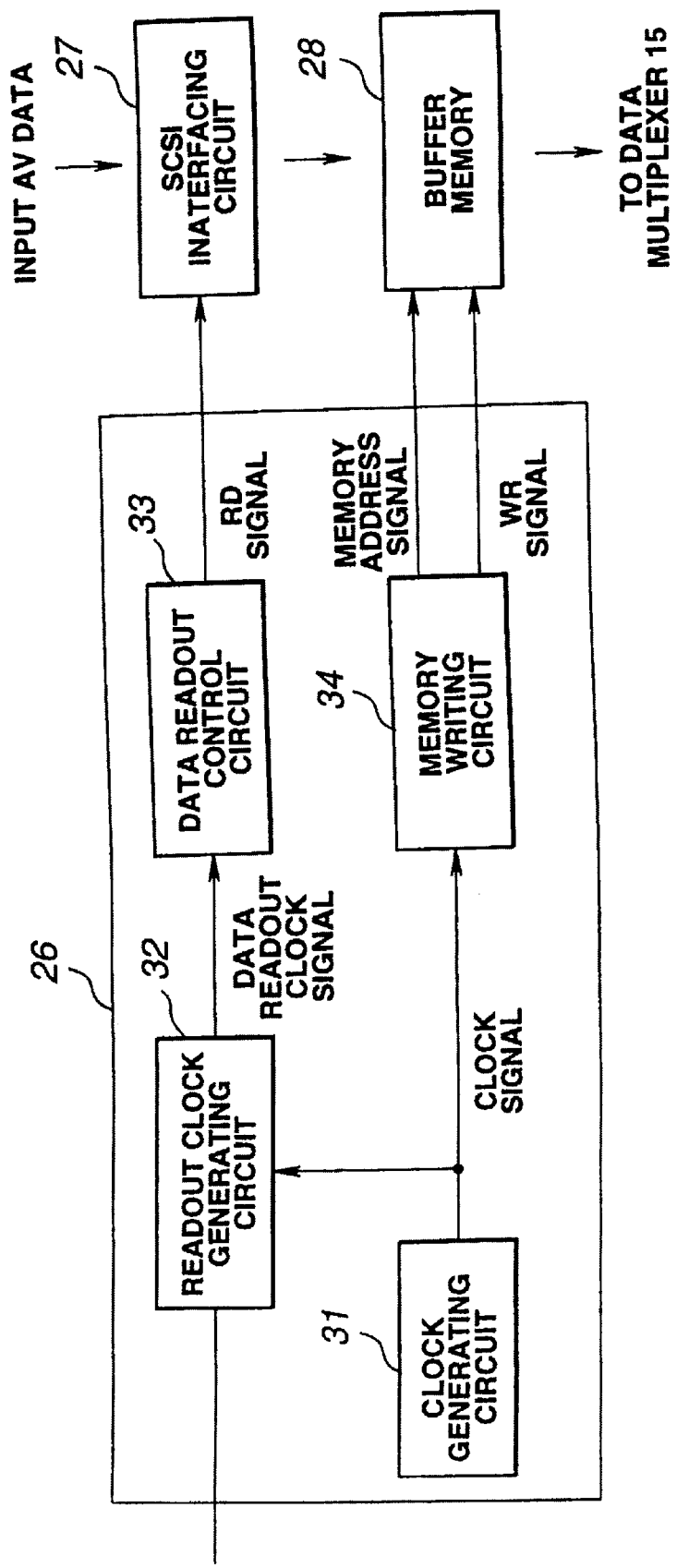
FIG. 9 is a block diagram of a data adjustment unit as an essential portion of the disc array device of FIG. 8.

This structure of the padding data processing circuit 26 is shown in detail in FIG. 9. The structure required for transferring AV data from the SCSI interfacing circuit 27 to the buffer memory 28 is now explained.

The padding data processing circuit 26 includes a clock generating circuit 31 for generating reference clock signals, and a readout clock generating circuit 32 for generating data readout clock signals based on clock signals from the clock generating circuit 31. The padding data processing circuit 26 also includes a data readout control circuit 33 for causing data to be read out from the SCSI interfacing circuit 27 to the buffer memory 28 by the above data readout clock signals and a memory write control circuit 34 responsive to the clock signals from the clock generating circuit 31 to control writing of the AV data in the buffer memory 28.

When the readout clock generating circuit 32 generates data readout clock signals, the data readout control circuit 33 routes a readout (RD) signal to the SCSI interfacing circuit 27. The AV data read out by the RD signals from the SCSI interfacing circuit 27 is written by a write signal WR in an address designated by a memory address signal generated by the memory write control circuit 34 responsive to the clock signals from the clock generating circuit 31.

Figure 4:
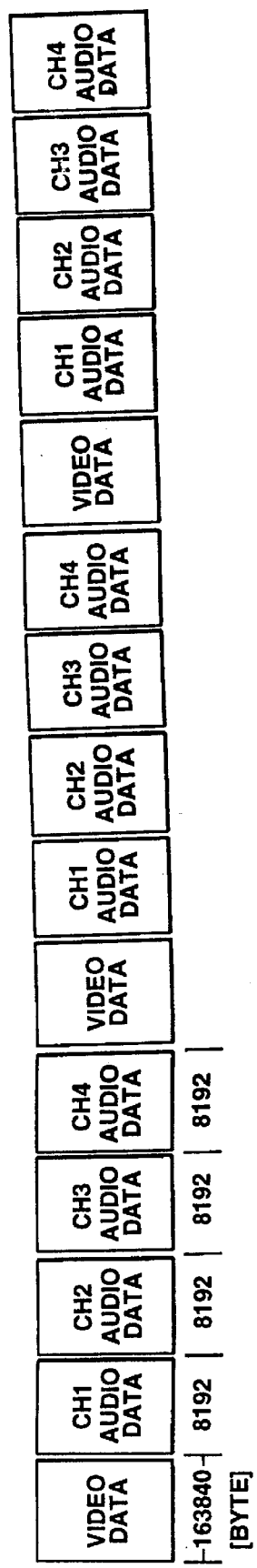
FIG. 4 shows an illustrative example of a transfer format.
Figure 5:
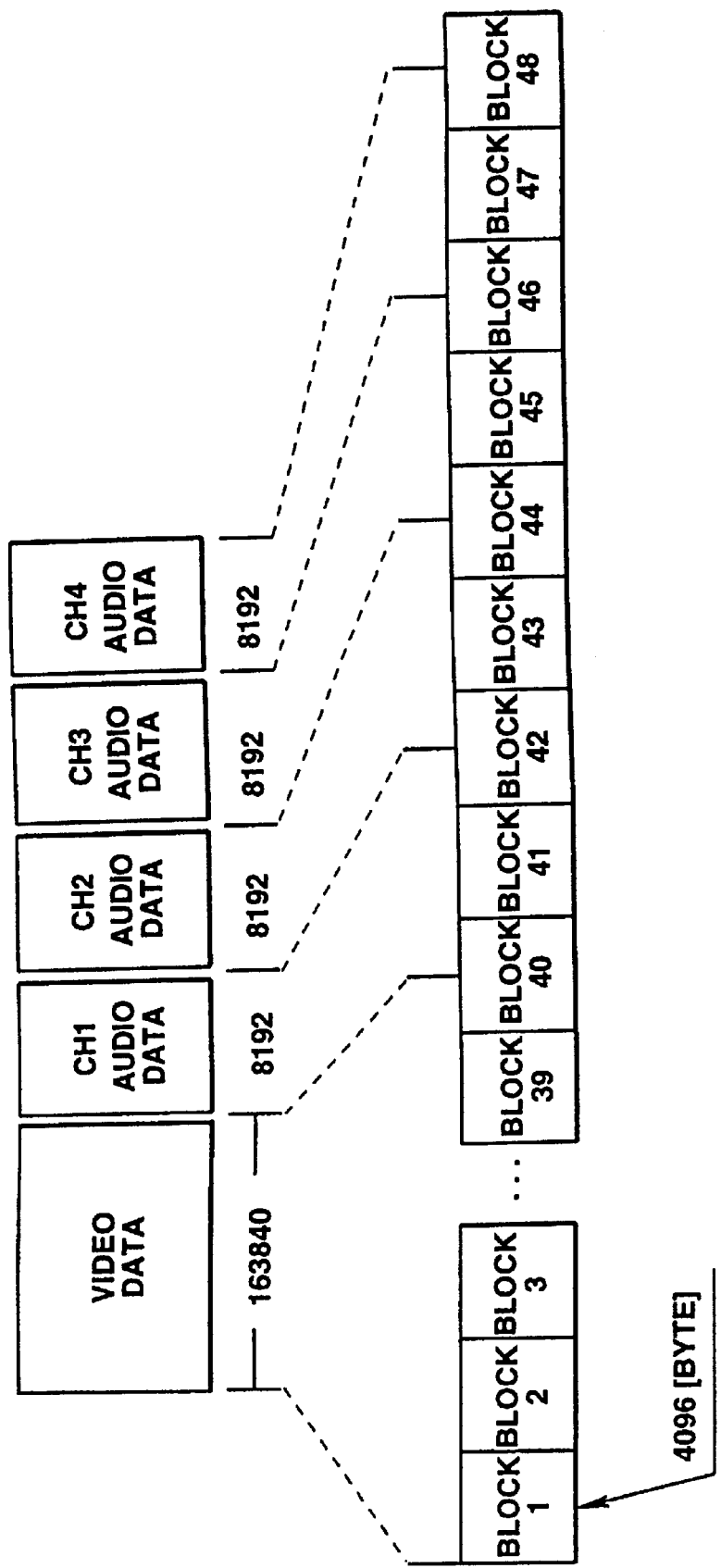
FIG. 5 illustrates the operation of the disc array device shown in FIG. 5.
Figure 6:
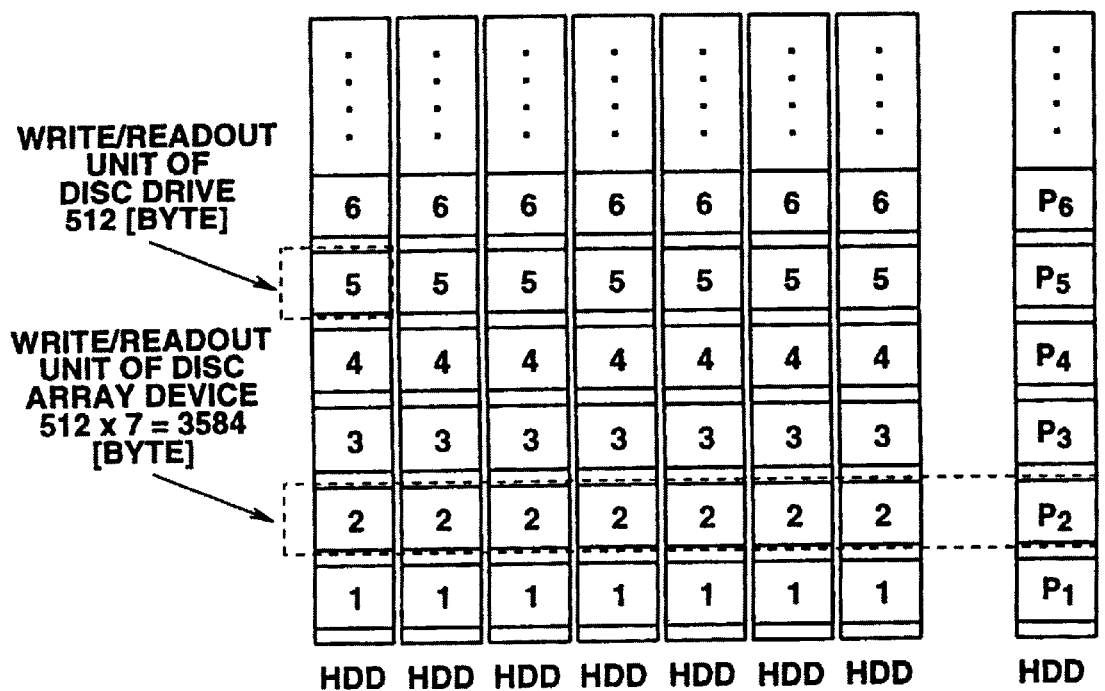
FIG. 6 shows the data array in case the number of HDDS making up the disc array device shown in FIG. 5 is reduced.
Figure 7:
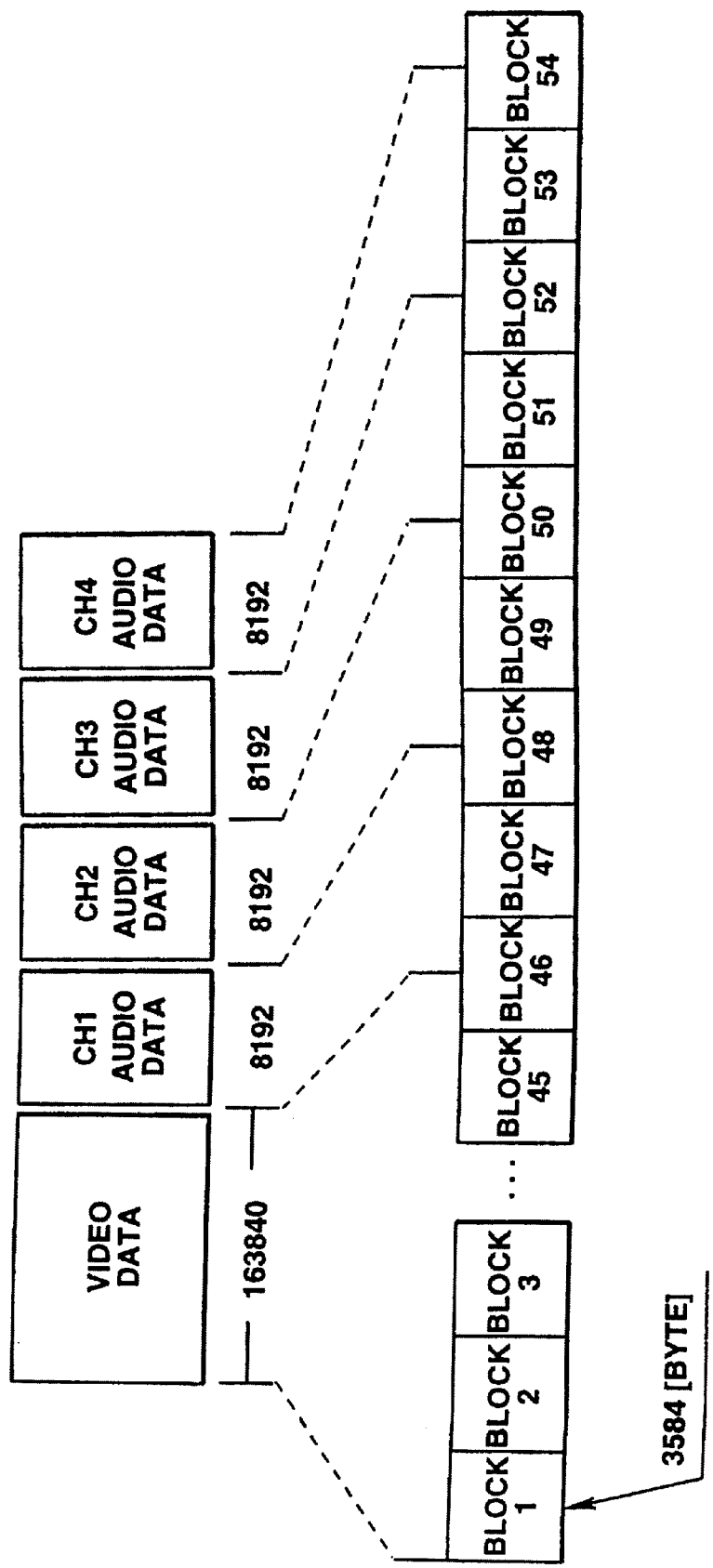
FIG. 7 illustrates the operation of the conventional disc array device in case the number of HDDS is reduced.
Figure 8:
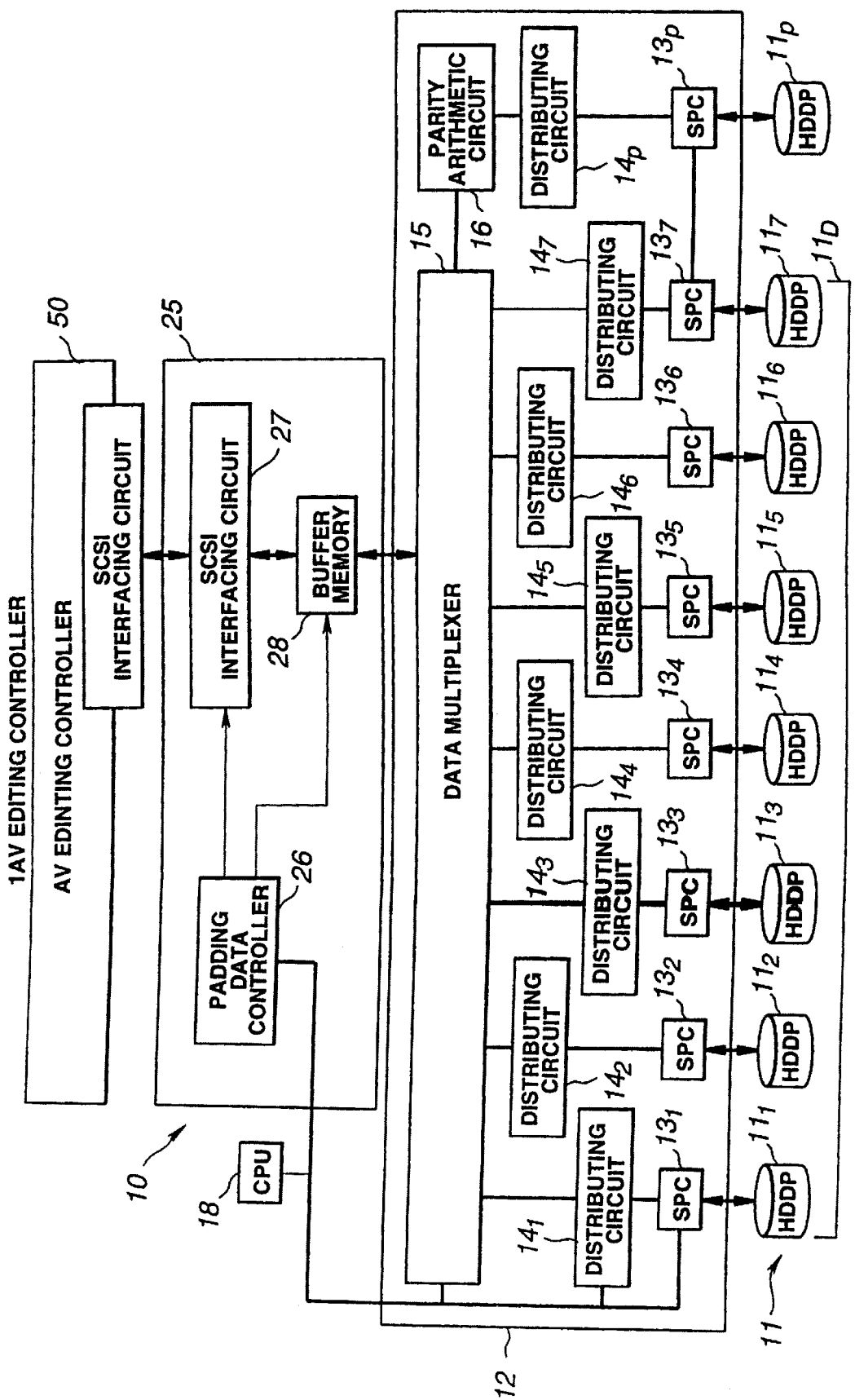
FIG. 8 is a block diagram showing a disc array device for use in a data recording/reproducing apparatus according to the present invention and an AV editing system employing this disc array device.

If the point of interruption of the video and audio data is coincident, as usual, with the point of junction of the blocks as write/readout units of the disc array device, the above-described operation occurs continuously, so that AV data having the transfer format as shown in FIG. 4 is written in the HDD of the disc array unit of the disc array device.

Conversely, if the data driving unit 11D, such as the disc array device 10 of the instant embodiment, is constituted by seven HDDs 111, 112, 113, 114, 115, 116, 117 and 11P, the points of interruption of the transfer format of the video and audio data ceases to be coincident with the points of junction of the blocks as write/readout units of the disc array device.

Figure 10:
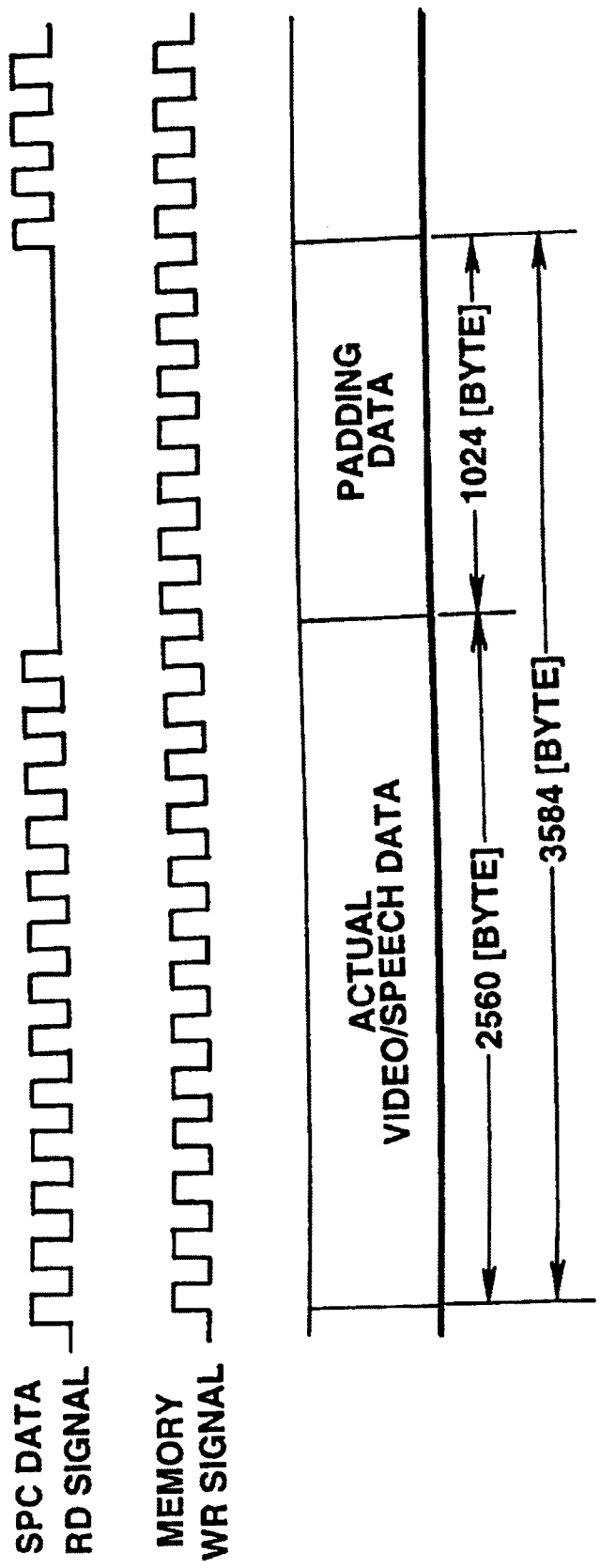
FIG. 10 is a timing chart for illustrating the operation of the data adjustment unit.

Thus the padding data processing circuit 26 is responsive to the setting by the CPU 18 to cause the data readout control circuit 33 to stop transmission of RD signals transiently at the point of data interruption, as shown in FIG. 10. This can be achieved by transiently stopping supply of the data readout clock signals from the readout clock generating circuit 32 to the data readout control circuit 33.

Even during the stop time of RD signal transmission from the data readout control circuit 33 to the SCSI interfacing circuit 27, 1024 bytes of padding data, such as 0 data, can be appended on the buffer memory 28, if the memory address signals generated by the memory write control circuit 34 and the WR signals are not stopped, even although data volume of the actual video/audio data is 2560 bytes for the block size of 3584 bytes of the disc array unit 11 as shown in FIG. 10, so that the points of interruption of the video or audio data can be made coincident with the junction points of the blocks of the disc array unit.

At the next point of data interruption, the readout clock generating circuit 32 re-initiates supply of the data readout clock signals, so that transmission of the next video or audio data is re-initiated by the RD signals of the data readout control circuit 33. By repetition of the above operations, the transferred data can be continuously recorded on the HDDs 111, 112, 113, 114, 115, 116, 117 and 11P of the disc array unit 11.

Thus, with the present padding data processing circuit 26, proper appendage of padding data can be automatically achieved by controlling the supply of the readout clock signals from the readout clock generating circuit 32 to the data readout control circuit 33 in timed relation to the transfer format. If the above operations are carried out continuously for effecting recording, the state A shown in FIG. 11 in which the points of interruption of the video and audio data are not coincident with the junction points of the blocks (write/readout units) of the disc array device 11 is changed over to the state B in which the points of interruption of the video and audio data are coincident with the junction points of the blocks of the disc array device 11.

That is, since the time duration during which the readout clock generating circuit 26 ceases to generate readout clock signals can be varied by the setting from the CPU 18, the padding data volume can be changed. Thus, even if the number of HDDs used in the inside of the disc array unit is increased or reduced in keeping up with improvement in HDD performance, equivalent or even superior performance may be realized while the demand for cost reduction and reduction in size of the device is met, thus realizing a disc array device which can be connected to a preexisting AV editing controller for constructing the AV editing system.

According to the SCSI standard, plural disc array devices can be connected by a daisy chain to a sole AV editing controller. However, according to the present invention, since the data transfer format can be set independently of the structure of the disc array unit, plural disc array devices of different structures can be connected by a daisy chain by the same transfer format.

Also, in consideration of the AV editing system, the disc array devices 10 can be changed in structure with the AV controller 50 remaining unchanged in structure, so that the disc array devices 10 can be exchanged for different disc array devices within the pre-existing system.

When reading out recorded data, accessing blocks can be determined in accordance with a pre-set rule and transmitted excluding the padding data which are discarded.

It is assumed that 163840 bytes if video data are read out in accessing units of 3584 bytes.

Figure 3:
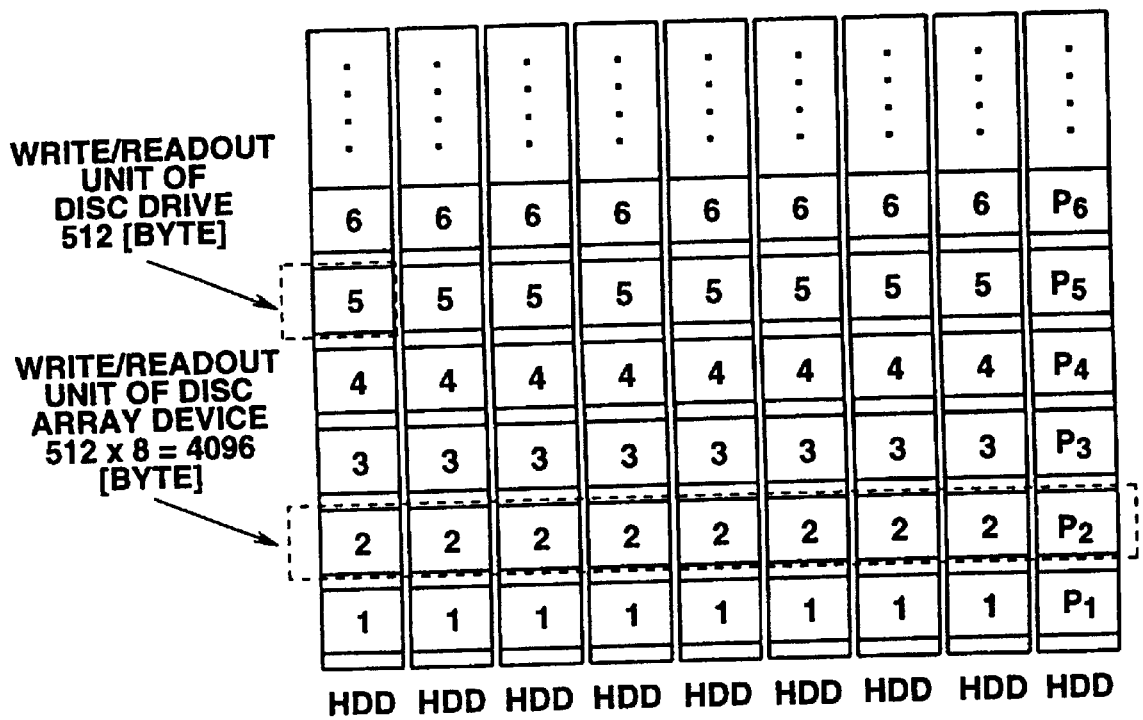
FIG. 3 shows data array on an HDD used for the disc array device shown in FIG. 5.
Figure 11:
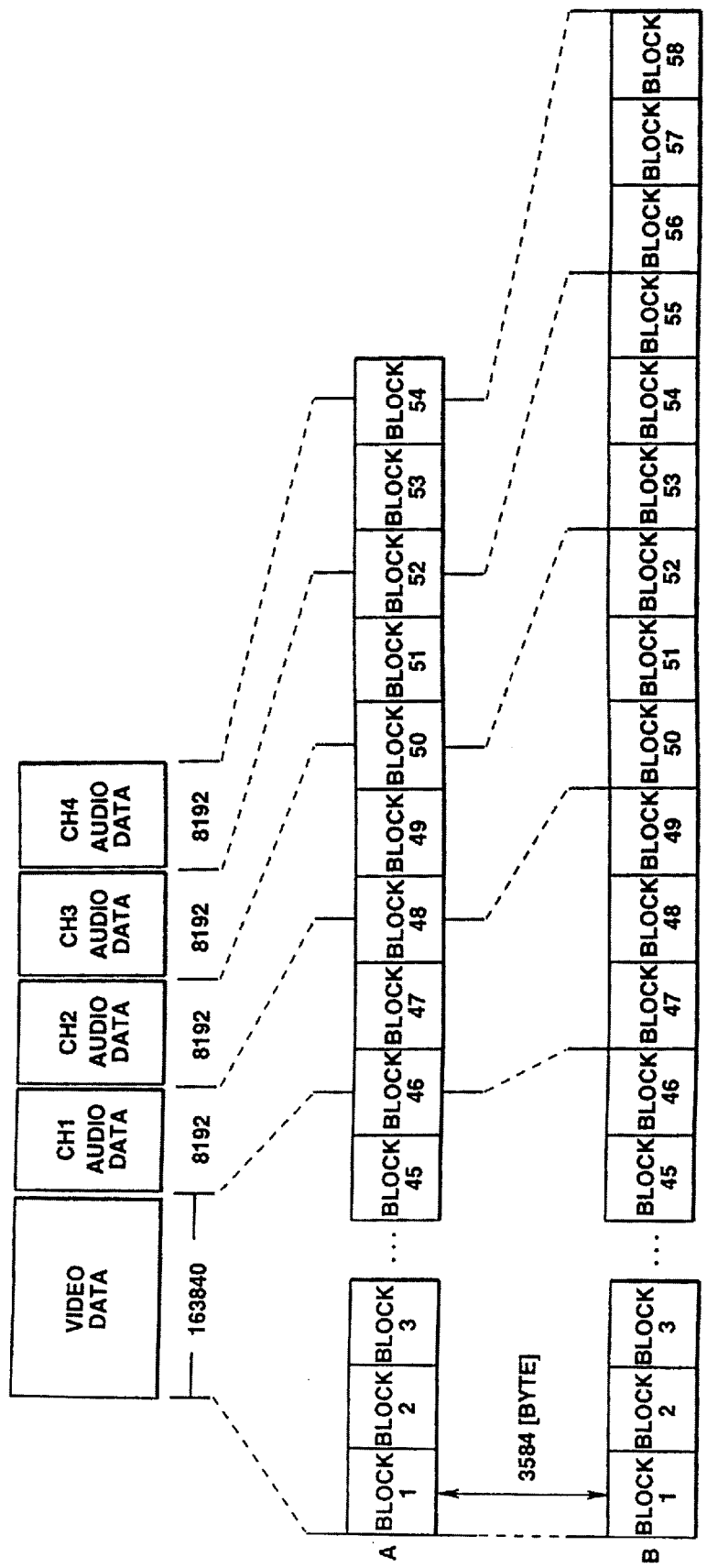
FIG. 11 shows the format for illustrating the operation of the disc array device of FIG. 8.

Referring to FIGS. 11 and 18, blocks 1 to 45 are directly read out because all data in the blocks are valid. As for the block 46, the trailing side 1024 bytes of the block are padding data, as shown in FIG. 3. Therefore, control is managed so that only 2560 bytes of the block 46 are handled as effective data, while the remaining 1024 bytes are not reproduced.

By having padding data of a block of a preset sequential number discarded in this manner, it becomes possible to read out recorded data.

Figure 12:
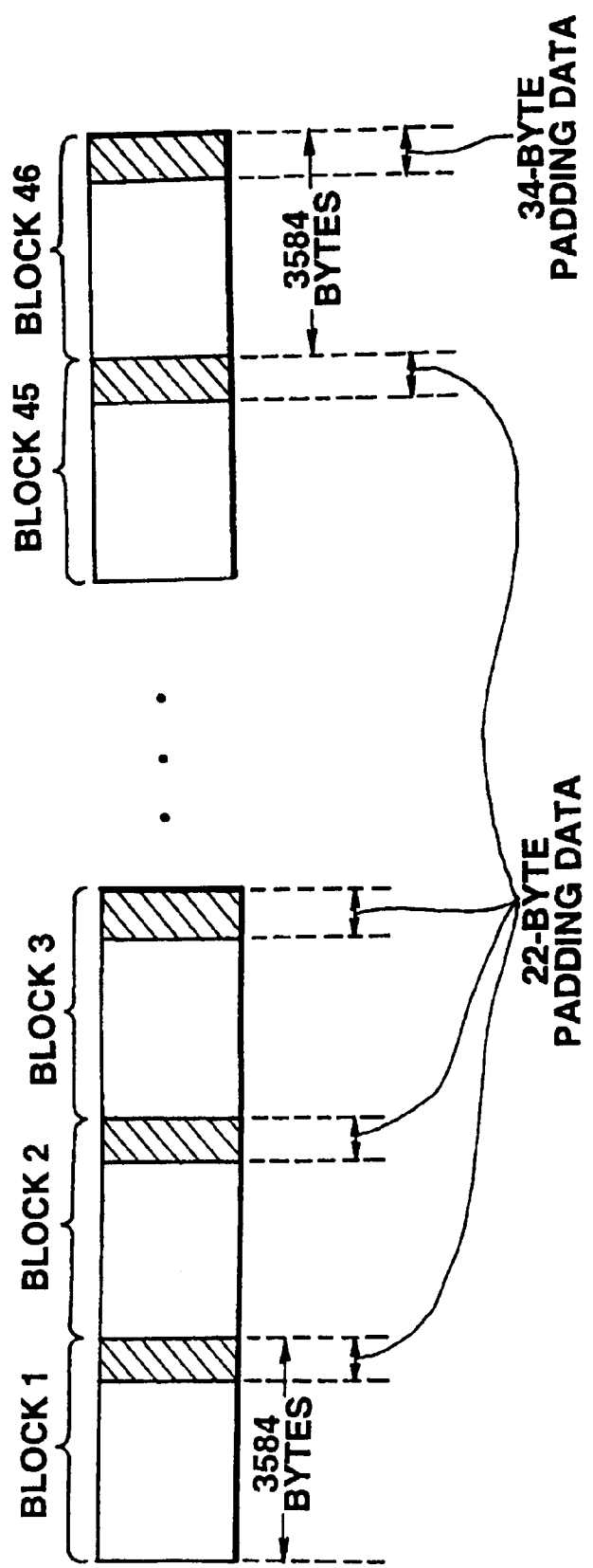
FIG. 12 illustrates another example of the method for processing padding data.

In the padding data processing circuit 26, the supply of read-out clock signals from the readout clock generating circuit 32 to the data readout control circuit 33 in accordance with the transfer format, padding data can be appended appropriately. Another example of the processing method for padding data is explained by referring to FIG. 12.

In the foregoing embodiment, 1024 bytes of padding data have been appended to the block 46. Alternatively, padding data may be appended in the blocks 1 to 46 in accordance with another pre-set rule. In the present embodiment, padding data is appended in the trailing side 22 bytes of the blocks 1 to 45, and to the trailing side 34 bytes of the block 46. For reading, 3562 bytes from the leading ends of the blocks 1 to 45 are valid data and hence are read out directly. The trailing side 22 bytes of these blocks are padding data and hence are discarded. As for the block 46, 3550 byte data from the leading end in the block are valid data and hence are directly read out, while the trailing side 34 bytes, which are padding data, are discarded.

In the present invention, nonsensical data, such as 0 data, are appended as padding data. However, data other than zero data may be used as the padding data since these padding data are not reproduced.

Although specified numbers of bytes are accorded in the above embodiments to the accessing units and transfer formats, any other numbers of bytes than those used in the illustrated embodiments may be used without departing from the scope of the present invention.

What is claimed is:

1. A data recording/reproducing apparatus comprising:
    a plurality of disc-shaped recording/reproducing means for recording and/or reproducing units of video and audio data in which the data size of a unit that can be accessed at a time can be controlled by changing the number of the recording/reproducing means loaded in position during data recording; and
    data adjustment means for appending padding data such that, if the volume of the video and audio data to be recorded is not equal to a multiple of the data size accessed at a time, the volume of the video and audio data to be recorded with the padding data appended thereto will be equal to the multiple so that an interruption between the video data and the audio data is coincident with a respective junction between units.

2. The data recording/reproducing apparatus as claimed in claim 1 wherein, when data recorded with the p adding data appended thereto are reproduced, said data adjustment means controls so that said padding data will no t be reproduced.

3. The data recording/reproducing apparatus as claimed in claim 2 wherein said video and audio data to be recorded have a format with a pre-set data size.

4. The data recording/reproducing apparatus as claimed in claim 3 further comprising:
    an interface for connection to an audio/video editing controller for editing said video and audio data.

5. The data recording/reproducing apparatus as claimed in claim 4 wherein
    said interface is an SCSI interface.

6. The data recording/reproducing apparatus as claimed in claim 3 wherein
    said data adjustment means appends padding data in the last accessing for recording the data so that, if the volume of data to be recorded is not equal to a multiple of the data size accessed at a time, the volume of data to be recorded with the padding data appended thereto will be equal to the multiple of the data size accessed at a time.

7. The data recording/reproducing apparatus as claimed in claim 6 wherein
    said data adjustment means when reproducing recorded data controls so that, during the last accessing for reproducing the recorded data, the padding data will not be reproduced.

8. The data recording/reproducing apparatus as claimed in claim 3 wherein
    said data adjustment means appends padding data in each accessing for recording the data so that, if the volume of data to be recorded is not equal to a multiple of the data size accessed at a time, the volume of data to be recorded with the padding data appended thereto will be equal to the multiple of the data size accessed at a time.

9. The data recording/reproducing apparatus as claimed in claim 8 wherein
    said data adjustment means when reproducing the recorded data controls so that, in each accessing for reproducing the recorded data, said padding data will not be reproduced.

10. The data recording/reproducing apparatus as claimed in claim 7 further comprising:
    a circuit for calculating the parity for data recorded on a plurality of said disc-shaped recording/reproducing means.

11. The data recording/reproducing apparatus as claimed in claim 10 wherein
    parity data outputted by said parity calculating circuit is recorded in a pre-set one of the plural disc driving devices.

12. A data recording method for recording units of video and audio data according to a format having a pre-set data size on a plurality of detachably mounted disc-shaped recording/reproducing means, comprising:
    setting a data size of a unit that can be accessed at a time in accordance with the number of said disc-shaped recording/reproducing means loaded in position at the time of data recording;
    appending padding data in the last accessing for recording the data such that, if the volume of the video and audio data to be recorded is not equal to a multiple of the data size accessed at a time, the volume of the video and audio data for recording with the padding data appended thereto will be equal to said multiple so that an interruption between the video data and the audio data is coincident with a respective junction between units; and recording the units of said video and audio data on said disc-shaped recording/reproducing means.

13. A method for reproducing data recorded by the data recording method as claimed in claim 12 comprising:

reproducing all read-out data in each accessing for reproducing the recorded data other than the last accessing in which said padding data have been appended; and reproducing the recorded data excluding said padding data in the last accessing in which said padding data have been appended.

* * * * *